United States Patent
Ueda et al.

(10) Patent No.: US 9,116,521 B2
(45) Date of Patent: Aug. 25, 2015

(54) AUTONOMOUS MOVING DEVICE AND CONTROL METHOD THEREOF

(75) Inventors: Taishi Ueda, Tokyo (JP); Ryosuke Nakamura, Tokyo (JP); Azusa Amino, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/131,046

(22) PCT Filed: Jul. 15, 2011

(86) PCT No.: PCT/JP2011/066200
§ 371 (c)(1),
(2), (4) Date: Jan. 6, 2014

(87) PCT Pub. No.: WO2013/011543
PCT Pub. Date: Jan. 24, 2013

(65) Prior Publication Data
US 2014/0148989 A1    May 29, 2014

(51) Int. Cl.
G01C 22/00    (2006.01)
G05D 1/00    (2006.01)
G05D 1/02    (2006.01)

(52) U.S. Cl.
CPC ............... *G05D 1/0088* (2013.01); *G05D 1/02* (2013.01); *G05D 1/024* (2013.01); *G05D 2201/0206* (2013.01)

(58) Field of Classification Search
CPC .................................................. G05D 1/0088
USPC .......................................................... 701/23
See application file for complete search history.

(56) References Cited

U.S. PATENT DOCUMENTS

| 8,532,860 B2* | 9/2013 | Daly ............................... 701/23 |
| 2008/0249660 A1 | 10/2008 | Nakamura |
| 2009/0043440 A1 | 2/2009 | Matsukawa et al. |
| 2010/0082196 A1 | 4/2010 | Sekiya |
| 2010/0235033 A1 | 9/2010 | Yamamoto et al. |

FOREIGN PATENT DOCUMENTS

| JP | 2008-65755 A | 3/2008 |
| JP | 2008-254134 A | 10/2008 |
| JP | 2009-110495 A | 5/2009 |
| JP | 2010-79852 A | 4/2010 |

OTHER PUBLICATIONS

International Search Report dated Aug. 16, 2011 with English translation (five (5) pages).

* cited by examiner

*Primary Examiner* — James Trammell
*Assistant Examiner* — Michael D Lang
(74) *Attorney, Agent, or Firm* — Crowell & Moring LLP

(57) ABSTRACT

An autonomous moving device includes a travel unit with a wheel driven by a motor and an upper body including an environment-recognition sensor that detects an obstacle in a traveling direction. The upper body includes means that recognize device and obstacle positions, means that evaluates avoidance capability, and means that obtains priority of collision avoidance of an estimated passage area of the obstacle. The upper body further includes a control unit that moves the travel unit to an area where an estimated passage area of an obstacle whose priority of collision avoidance is high that does not overlap an area where the travel unit is located and which is an area where collision can be avoided even if an area where an estimated passage area of an obstacle whose priority of collision avoidance is low overlaps the area where the travel unit is located.

6 Claims, 12 Drawing Sheets

(a)

(b)

(a)

(b)

(c-1)

(c-2)

(a)

(b)

(c)

(a)

(b)

(a)

(b)

AUTONOMOUS MOVING DEVICE AND CONTROL METHOD THEREOF

TECHNICAL FIELD

The present invention relates to an autonomous moving device with obstacle avoidance capability and a control method thereof.

BACKGROUND ART

When an autonomous moving device such as a robot moves in human life space, the movement of the autonomous moving device may be an obstacle for a person in some cases, so that some sort of countermeasure is required.

As a background art for such a case, for example, there is Japanese Unexamined Patent Application Publication No. 2010-79852 (Patent Literature 1). In Patent Literature 1, while the autonomous moving device is moving according to a target position trajectory, even when the movement is interrupted by an obstacle, the autonomous moving device can recognize the behavior of the obstacle. Further, when the obstacle, which is an object (human being, another autonomous moving device, and the like) that can autonomously move, moves, if the autonomous moving device can move according to a current target position trajectory, the autonomous moving device can control action to urge the obstacle to move to make way for the autonomous moving device.

CITATION LIST

Patent Literature

Patent Literature 1: Japanese Unexamined Patent Application Publication No. 2010-79852
Patent Literature 2: Japanese Unexamined Patent Application Publication No. 2008-65755

SUMMARY OF INVENTION

Technical Problem

If there are plural obstacles that interrupt movement of the autonomous moving device, each obstacle may have different avoidance capabilities such as acceleration and deceleration capability and a movable direction.

For example, in a hospital, there is a case in which a passage is blocked by a healthy person, a wheelchair, and a disabled person at the same time. In this case, the avoidance capability of the wheelchair and the disabled person is lower than that of the healthy person. Therefore, if the autonomous moving device is located at a position at which the autonomous moving device blocks the way of the wheelchair or the disabled person, there is a probability that it takes time to pass each other or the wheelchair or the disabled person accidentally contacts with the autonomous moving device. In this case, if the autonomous moving device moves in the way of the healthy person whose avoidance capability is high, the influence on the movement of the wheelchair and the disable person is small.

However, for example, if the autonomous moving device moves in front of the healthy person, there is a probability that the avoidance behavior of the healthy person takes time or causes accidental contact, so that it is necessary for the autonomous moving device to move to a position where the healthy person can easily avoid the autonomous moving device.

In order to efficiently and safely cope with a situation in which the movement is blocked by plural obstacles in this way, it is necessary to provide an autonomous moving device which moves to a position where the influence on the movement of the obstacle whose avoidance capability is low is small and where and the obstacle whose avoidance capability is high can easily avoid the autonomous moving device. However, the technique described in Patent Literature 1 may not be able to safely cope with the situation because the technique does not consider the case in which the autonomous moving device confronts plural obstacles.

An object of the present invention is to provide an autonomous moving device which, when there are plural obstacles that block the movement of the autonomous moving device, can move to a position where the influence on the movement of the obstacle whose avoidance capability is low is small and where the obstacle whose avoidance capability is high can easily avoid the autonomous moving device.

Solution to Problem

The above object can be achieved by an autonomous moving device including a travel unit including a wheel driven by a motor and an upper body including an environment recognition sensor that detects an obstacle in a traveling direction. In the autonomous moving device, the upper body includes a means for recognizing a position of the autonomous moving device and an obstacle, a means for evaluating avoidance capability of the obstacle, a means for determining capability of avoidance of collision with the obstacle, and a means for obtaining priority of collision avoidance of an estimated passage area of the obstacle from the capability of avoidance of collision, and the upper body further includes a control unit that moves the travel unit to a range which is an area where an estimated passage area of an obstacle whose priority of collision avoidance is high does not overlap an area where the travel unit is located and which is an area where collision can be avoided even if an area where an estimated passage area of an obstacle whose priority of collision avoidance is low overlaps the area where the travel unit is located.

To achieve the above object, it is preferable that the means for evaluating avoidance capability quantitatively calculates the avoidance capability from a velocity and a width of the obstacle.

To achieve the above object, it is preferable that the means for evaluating avoidance capability sets avoidance priority of the obstacle whose avoidance capability is lower than a reference value to be high.

To achieve the above object, it is preferable that the means for evaluating avoidance capability sets avoidance priority of an obstacle whose velocity is slower than a reference range and an obstacle whose velocity is faster than the reference range to be high.

To achieve the above object, it is preferable that the means for evaluating avoidance capability classifies the obstacle into several types on the basis of avoidance capability.

The above object can be achieved by a control method of an autonomous moving device including a communication device that communicates with a computer including an information storage unit, a travel information calculation unit, an obstacle recognition unit, a travel control unit, an obstacle classification unit, a destination point setting unit, and an action determination unit. The control method includes a step of determining the presence or absence of information from the obstacle classification unit. a step of transmitting a final destination point in the information storage unit to the travel control unit as a current destination point when no information is transmitted from the obstacle classification unit, a step of obtaining a passable area in which the autonomous moving device can travel without colliding with an obstacle by a travel unit when information is transmitted from the obstacle classification unit, a step of estimating a passage area of a currently captured obstacle, a step of setting a virtual passable area which is an area virtually set to be passable for the sake of calculation, and a step of determining a destination point based on the virtual passable area.

Advantageous Effects of Invention

According to the present invention, it is possible to provide an autonomous moving device which, when there are plural obstacles that block the movement of the autonomous moving device, can move to a position where the influence on the movement of the obstacle whose avoidance capability is low is small and where the obstacle whose avoidance capability is high can easily avoid the autonomous moving device.

DESCRIPTION OF EMBODIMENTS

Hereinafter, multiple embodiments will be described with reference to the drawings. In the embodiments, the width of passage through which an autonomous moving device passes has a length in which the autonomous moving device and another obstacle can pass each other at all times.

First Embodiment

The present embodiment will be described with reference to FIGS. 1 to 11.

An overview of the autonomous moving device realized by the present embodiment will be described with reference to FIG. 1.

FIGS. 1(a) to 1(c) are conceptual diagrams showing movement of the autonomous moving device according to the first embodiment of the present invention.

Figure 1:
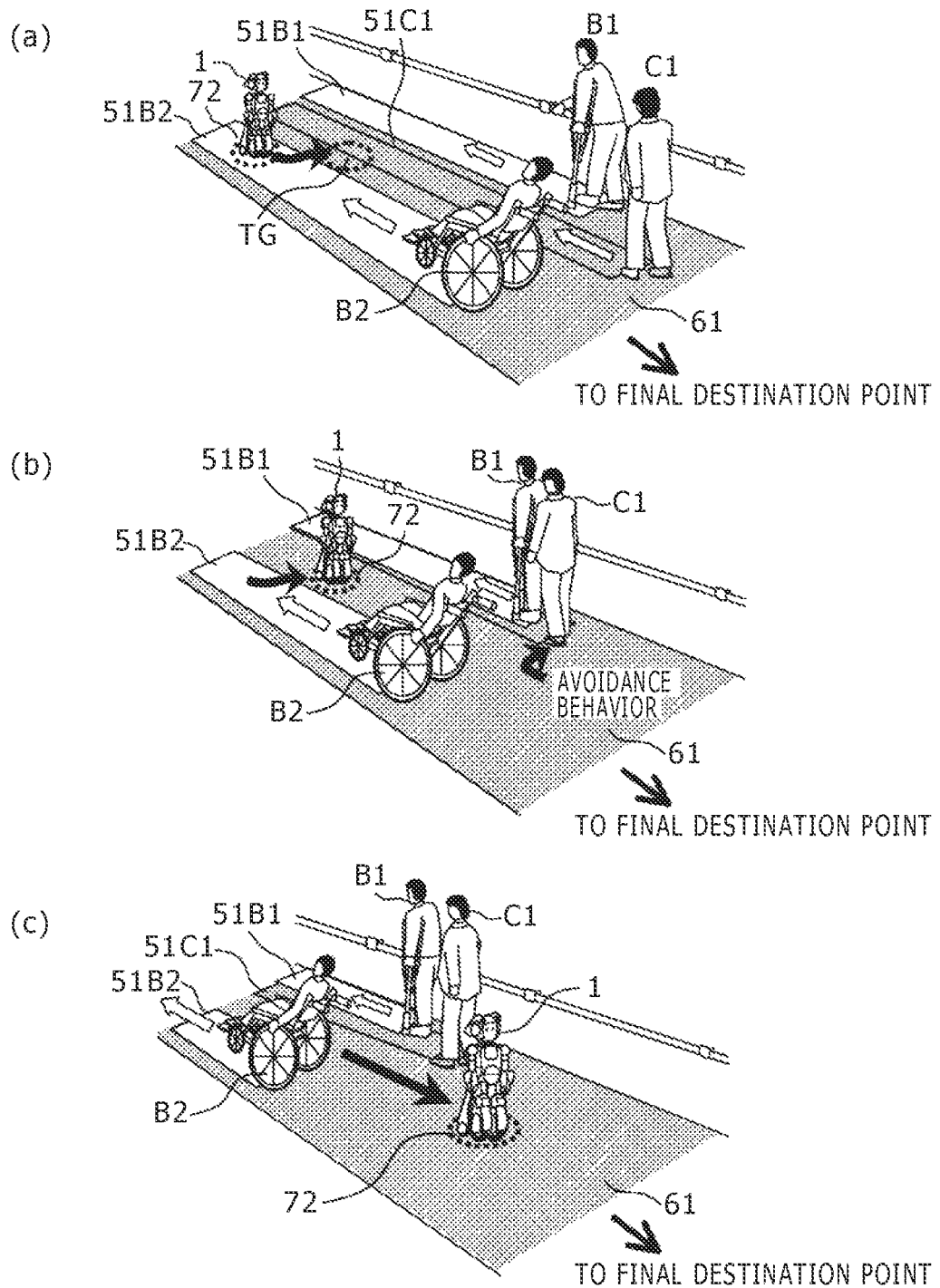
FIG. 1 is a conceptual diagram showing movement of an autonomous moving device according to a first embodiment of the present invention.
Figure 2:
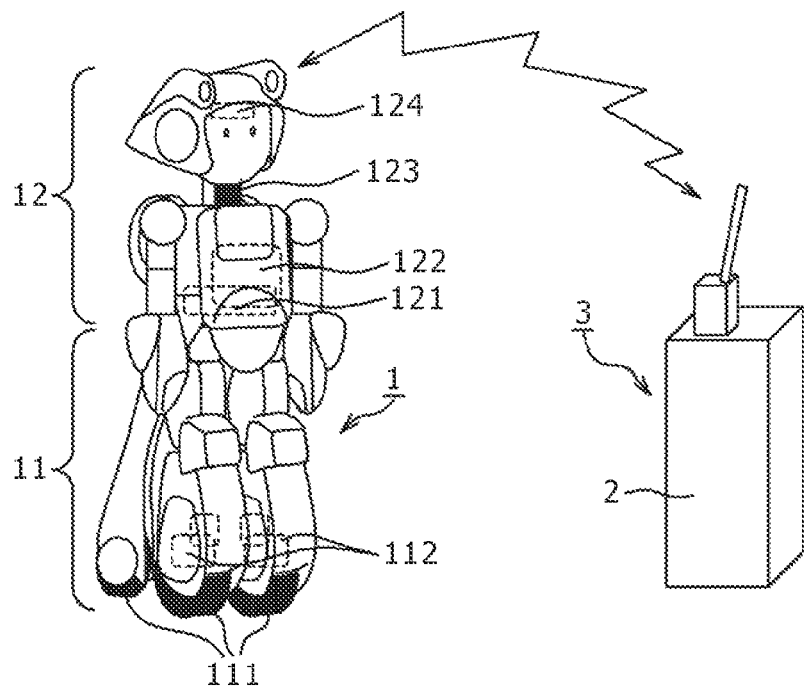
FIG. 2 is a schematic configuration diagram of the autonomous moving device according to the first embodiment.
Figure 2:
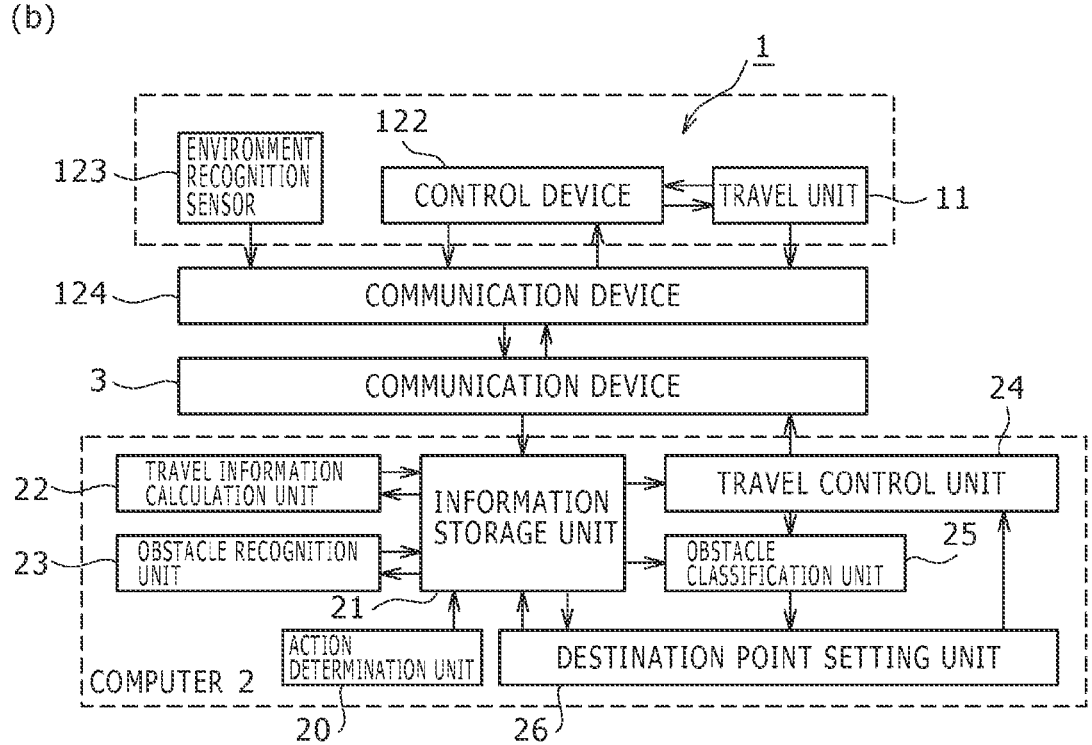

In FIG. 1, when the movement of the autonomous moving device 1 is blocked by plural obstacles traveling in a virtual passable area 61 (a travel path), the autonomous moving device 1 evaluates avoidance capabilities of the obstacles and calculates avoidance priorities.

In the case of FIG. 1(a), the autonomous moving device 1 recognizes that a disabled person B1 and a wheelchair B2 are obstacles with high avoidance priority because the avoidance capabilities of the disabled person B1 and the wheelchair B2 are lower than that of a healthy person C1. Areas 51B1 and 51B2 are passage areas through which it is estimated that the disabled person B1 and the wheelchair B2 will pass. The autonomous moving device 1, which estimates the passage areas 51B1 and 51B2, avoids the disabled person B1 and the wheelchair B2, which have high avoidance priority, and moves to a position which is outside the passage areas 51B1 and 51B2 and where a required course change of the healthy person C1, who has low avoidance priority, is small.

In a state of FIG. 1(b), the healthy person C1, who observes the autonomous moving device 1 which changes course to the passage areas of the healthy person C1 with low avoidance priority, moves behind the disabled person B1 and prioritizes the travel of the autonomous moving device 1.

In a state of FIG. 1(c), after confirming that there is no obstacle in the passage area, the autonomous moving device 1 can quickly pass through by avoiding the disabled person B1 and the wheelchair B2.

Under the situation of FIG. 1(a), a conventional autonomous moving device 1 does not evaluate the avoidance capabilities of the obstacles and does not set the passage area, so that the conventional autonomous moving device 1 does not completely depart from the passage areas of the obstacles with low avoidance capabilities. Therefore, the disabled person B1 and the wheelchair B2 with low avoidance capabilities change their courses, so that the efficiency may be bad and a risk may occur.

On the other hand, the autonomous moving device 1 of the present invention can move to a position where the autonomous moving device 1 does not block the way of the obstacles with low avoidance capabilities and which the obstacle with high avoidance capability can easily avoid.

FIGS. 2(a) and 2(b) are schematic configuration diagrams of the autonomous moving device according to the first embodiment.

FIG. 2(a) is a mechanical configuration diagram and FIG. 2(b) is a system configuration diagram of the autonomous moving device 1 according to the present embodiment. In the present embodiment, it is assumed that the autonomous moving device 1 is smaller than a human being and mainly travels indoors.

The mechanical configuration of the present invention will be described with reference to FIG. 2(a). The autonomous moving device 1 includes a travel unit 11 and an upper body 12. The autonomous moving device 1 externally has a computer 2 connected to a communication device 3 and the autonomous moving device 1 and the computer 2 bi-directionally exchange information by wireless communication (indicated by arrows) through the communication device 3 and a communication device 124.

The travel unit 11 includes wheels 111 and drive motors 112 with an encoder. The upper body 12 includes a battery 121, which is a power source of the autonomous moving device, and a control device 122. The upper body 12 includes a laser scanner as an environment recognition sensor 123 that detects an obstacle and the communication device 124 that communicates with the computer 2. As shown in FIG. 2(b), the computer 2 includes an information storage unit 21, a travel information calculation unit 22, an obstacle recognition unit 23, a travel control unit 24, an obstacle classification unit 25, a destination point setting unit 26, and an action determination unit 20.

The system configuration of the present invention will be described with reference to FIG. 2(b). The detailed processes of each component will be described later.

First, obstacle information acquired from the environment recognition sensor 123 and wheel turning angle velocity acquired from the travel unit 11 are transmitted to the information storage unit 21 of the computer 2 through the communication device 124 included in the autonomous moving device 1 and the communication instrument 3 connected to the computer 2. The information storage unit 21 store information necessary to control the autonomous moving device, such as a final destination point inputted from the action determination unit 20, measurement data from the environment recognition sensor 123 and the encoder of the motor 112, the current position, orientation, and velocity of the autonomous moving device 1 calculated by the travel information calculation unit 22, and the current position and velocity of an obstacle calculated by the obstacle recognition unit 23 in a memory of the computer 2 or updates/calls data in the memory.

The final destination point of the action determination unit 20 is inputted by a person from a terminal of the computer 2 or determined by a program in advance. The travel information calculation unit 22 calculates the current origin reference coordinates, orientation, forward velocity, and tangential velocity of the autonomous moving device 1 from measurement result of the encoder of the motor 112 stored in the information storage unit 21 and returns the current origin reference coordinates, orientation, forward velocity, and tangential velocity to the information storage unit again. The obstacle recognition unit 23 estimates the coordinates, velocity, and width of an obstacle from measurement result of the environment recognition sensor 123 stored in the information storage unit 21 and returns the coordinates, velocity, and width to the information storage unit 21.

The travel control unit 24 transmits a target forward velocity and a target tangential velocity to the control device 122 through the communication devices 3 and 124 on the basis of obstacle information in the information storage unit 21 and a current destination point set by the destination point setting unit 26. Further, the travel control unit 24 determines whether the autonomous moving device 1 can avoid the obstacle at all times and if the autonomous moving device 1 cannot avoid the obstacle, the travel control unit 24 notifies the obstacle classification unit 25 that the autonomous moving device 1 cannot avoid the obstacle. When the obstacle classification unit 25 is notified that the autonomous moving device 1 cannot avoid the obstacle from the travel control unit 24, the obstacle classification unit 25 classifies the obstacle by avoidance capability, determines avoidance priority order of the obstacle, and notifies the destination point setting unit 26 of the avoidance priority order.

When no information is transmitted from the obstacle classification unit 25, the destination point setting unit 26 notifies the travel control unit 24 of the final destination point of the travel information storage 21 as a current destination point, and when information is transmitted from the obstacle classification unit 25, the destination point setting unit 26 calculates a point at which the autonomous moving body 1 does not block the way of an obstacle of high avoidance priority order and at which an obstacle with low avoidance priority order can easily avoid the autonomous moving device 1 and notifies the travel control unit 24 of the point as a destination point.

Thereafter, the travel control unit 24 re-calculates a straight forward velocity and a tangential velocity to advance to the destination point set by the destination point setting unit 26 while avoiding the obstacle and indicates the straight forward velocity and the tangential velocity to the control device 122 through the communication devices 3 and 124. The control device 122 controls moving direction and moving velocity of the travel unit 11 on the basis of information of the velocity indication from the information storage unit 21 and the travel unit 11.

Hereinafter, the details of the calculation process of each component will be described.

In the present embodiment, a laser scanner is used as the environment recognition sensor 123, and a data string of distances to the obstacle at a predetermined angle interval is transmitted to the information storage unit 21 through the communication devices 124 and 3. The encoder of the motor 112 detects the turning angle velocity of the wheel and transmits the turning angle velocity to the information storage unit 21 through the communication devices 124 and 3.

The information storage unit 21 stores an origin which is set by a user when starting the autonomous moving body, the coordinates of the final destination point with respect to the origin, the obstacle information and the turning angle velocity of the wheel for the past several seconds, and the calculation results of the travel information calculation unit 22 and the obstacle recognition unit 23 into the memory of the computer 2.

The travel information calculation unit 22 calculates the current origin reference coordinates, orientation, forward velocity, and tangential velocity of the autonomous moving device 1 from time history of the turning angle velocity of the wheel and the orientation of the autonomous moving device 1 stored in the information storage unit 21 and returns the current origin reference coordinates, orientation, forward velocity, and tangential velocity to the information storage unit 21 again.

The obstacle recognition unit 23 estimates the coordinates, velocity, and width of the obstacle from the data obtained from the environment recognition sensor 123 and transmits the coordinates, velocity, and width to the information storage unit 21. Although a laser scanner is used in the present embodiment, the obtained data is a data string of each predetermined angle interval. Therefore, a recognition method for recognizing that plural obstacles are separate obstacles is required.

For example, as the recognition method, there is a method of Japanese Unexamined Patent Application Publication No. 2008-65755.

In this method, first, an abrupt change point of distance values obtained from the laser scanner with respect to angle at a certain time t, the data string is divided into groups of continuous points, and the divided data string is stored as segments in the information storage unit 21. Thereby, feature amounts such as a representative point such as the center of gravity, a shape, and the like of each segment at the time t are recognized. Next, the same calculation is performed at the time t+Δt and the feature amounts of each segment are obtained.

Here, the feature amounts of the segments obtained at the time t are compared with the feature amounts of the segments obtained at the time t+Δt, segments whose feature amounts are similar to each other are recognized to be the same obstacle, the velocity of the obstacle can be obtained from the amount of change of the representative position, and the width of the obstacle can be obtained from the shape. An obstacle whose moving velocity is substantially 0 is assumed to be a stationary obstacle, each data point obtained by the laser scanner is assumed to be an obstacle with a width of 0, and the assumed obstacles are stored in the information storage unit 21.

In the travel control unit 24, a generally well-known obstacle avoidance method "The Dynamic Window Approach to Collision Avoidance." (IEEE Robotics & Automation Magazine 4(1), pp. 23-33, 1997) is used. This method selects pk and vq which maximize G(pk, vq) of an objective function shown by the formula 1 in which a distance-to-obstacle function Lcol(pk, vq) when the autonomous moving device 1 travels at several levels of target tangential velocity candidates p1, p2, . . . , pk and several levels of target forward velocity candidates v1, v2, . . . , vq, at which the autonomous moving device 1 can travel, a directional function θgoal(pk) with respect to destination point coordinates transmitted from the destination point setting unit, and a forward velocity function V(vq) are evaluated and these functions are multiplied by α, β, and γ respectively and summed up.

[Formula 1]

$$G(pk,vq)=\alpha \cdot Lcol(pk,vq)+\beta \cdot \theta goal(pk)+\gamma \cdot V(vq) \quad \text{(Formula 1)}$$

The α, β, and γ can be set by a simulation or an experimental rule. The selected target tangential velocity pk and target forward velocity vq are transmitted to the control device 122 through the communication devices 3 and 124. If only moving destination candidates whose angle θ of velocity vector to the destination point is greater than or equal to 90° or G(pk, vq) is the maximum when vq≤0, it is determined that it is impossible to avoid obstacles while approaching the destination point and an avoidance impossible flag is transmitted to the obstacle recognition unit 23.

When the obstacle classification unit 25 receives the avoidance impossible flag from the travel control unit, the obstacle classification unit 25 classifies the obstacles by avoidance capability from the velocity and width of the obstacles stored in the information storage unit 21 and determines the avoidance priority order. The avoidance capability of a healthy pedestrian is assumed to be the highest. If the width of the obstacle is greater than that of an ordinary pedestrian, the obstacle is assumed to be a moving body other than a human being and the avoidance capability is assumed to be low. A moving body whose moving velocity is slower than that of a healthy pedestrian is assumed to be a moving body other than a human being, or a person who carries a heavy thing, or a disabled person. A moving body whose moving velocity is faster than that of a healthy pedestrian is assumed to be a moving body whose velocity and course are difficult to be changed quickly, such as a runner and a bicycle. The avoidance capabilities of the above moving bodies are assumed to be low. In the present embodiment, the avoidance capability of the obstacle is evaluated by using the sum R obtained by summing up the width W and the velocity V of the obstacle, which are multiplied by weights a and b, and the obstacles are classified from the R and the width W and the velocity V of the obstacles.

[Formula 2]

$$R = a \cdot W + b \cdot V \quad \text{(Formula 2)}$$

The weights a and b are obtained from the upper limit value Rmax of the R of a healthy person described later. The classification method will be described with reference to FIG. 3.

Figure 3:
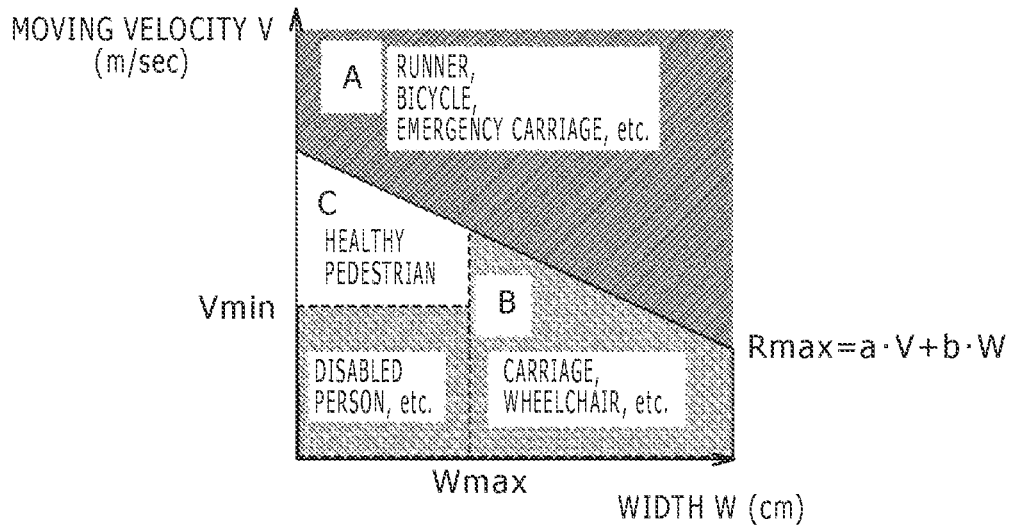
FIG. 3 is a diagram for explaining a classification method of obstacles according to the first embodiment.

FIG. 3 is a diagram for explaining the classification method of the obstacles according to the first embodiment.

In FIG. 3, when the lower limit velocity of a healthy pedestrian is Vmin, the upper limit width of a healthy pedestrian is Wmax, and the upper limit of the R of a healthy pedestrian is Rmax, the obstacle is classified as described below and the avoidance priority is defined as A>B>C.

[Formula 3]

If R>Rmax,class A

If (V<Vmin and W<Wmax) or (R<Rmax and W>Wmas),class B

If Vmin<V and W<Wmax and R<Rmax,class C  (Formula 3)

The Rmax is heuristically determined so that the obstacles are classified as shown in FIG. 3. From the Rmax, a and b in the formula 2 are determined. A moving body of the class A whose R is great is a wide and heavy moving body or a moving body that moves at a high speed, so that it is difficult for the moving body to change the velocity and change the course. Therefore, the autonomous moving device 1 has to actively avoid the moving body. A moving body of the class B whose V and R are small and W is great is a moving body that cannot change the course easily but can stop easily because of the size and the low velocity thereof, so that it is assumed that the moving body can avoid collision with the autonomous moving device 1 by stopping itself. A moving body of the class C has the same avoidance capability as that of a healthy person because of the velocity and the width, so that it is assumed that the moving body can easily avoid the autonomous moving device 1.

The operation of the destination point setting unit 26 will be described with reference to FIGS. 5 to 8 on the basis of a flowchart in FIG. 4.

Figure 4:
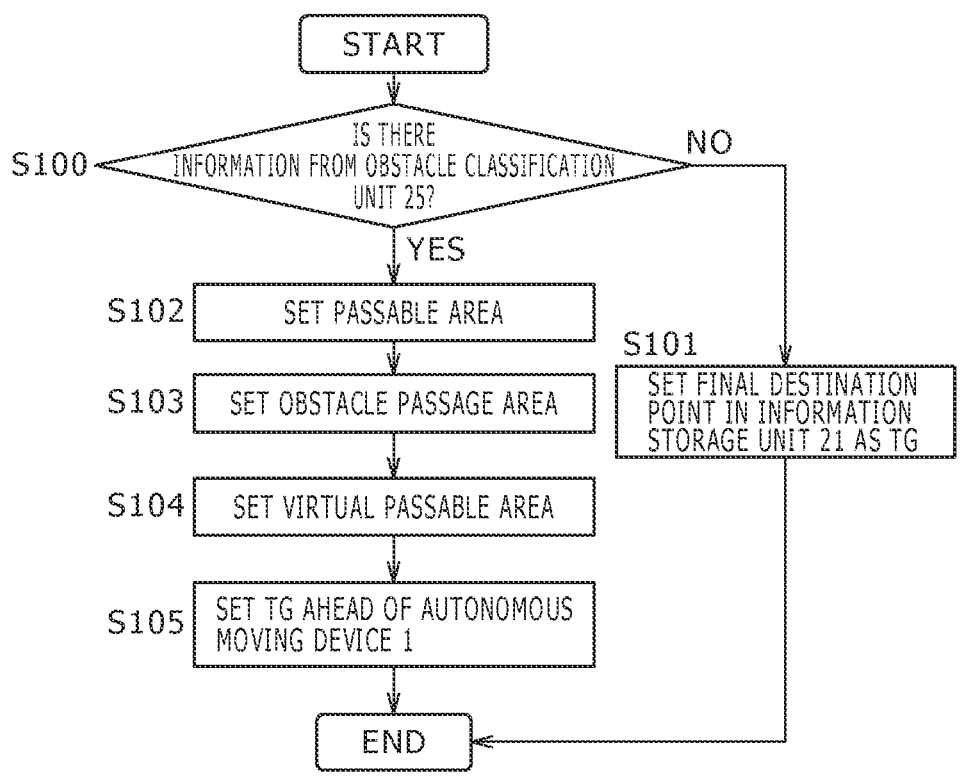
FIG. 4 is an operation flowchart of a destination point determination unit according to the first embodiment.

FIG. 4 is an operation flowchart of the destination point determination unit according to the first embodiment.

In FIG. 4, when no information is transmitted from the obstacle classification unit 25 in S100, the destination point setting unit 26 proceeds to S101. When information is transmitted from the obstacle classification unit 25 to the destination point setting unit 26, the destination point setting unit 26 proceeds to S102 and the subsequent steps, calculates a point TG at which the autonomous moving body 1 does not block the way of an obstacle of high avoidance priority order and at which an obstacle with low avoidance priority order can easily avoid the autonomous moving device 1, and notifies the travel control unit 24 of the point TG as a destination point.

In step 101, the destination point setting unit 26 notifies the travel control unit 24 of the final destination point in the information storage unit 21 as the current destination point TG.

Figure 5:
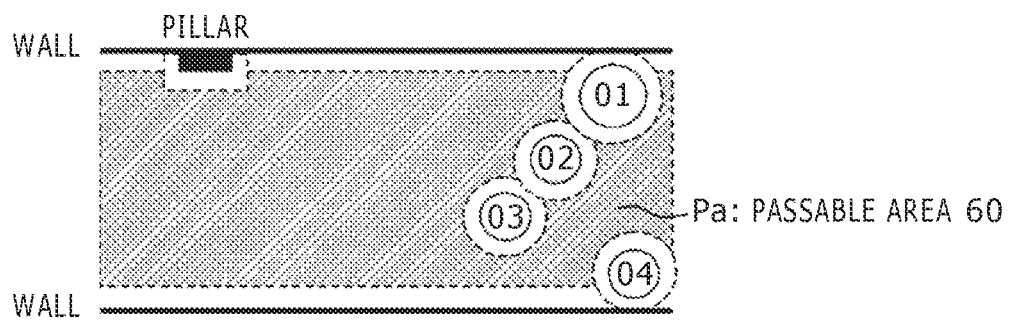
FIG. 5 is a diagram for explaining a passable area according to the first embodiment.

In S102, as shown by the shaded area in FIG. 5, a passable area 60 is obtained in which the autonomous moving device 1 can travel without colliding with an obstacle by the travel unit 11. The passable area 60 is defined as Pa and the formula 4 is defined from the coordinates Oi and the width Wi of an ith obstacle (i=1, 2, . . . , N) stored in the information storage unit 21.

[Formula 4]

$$Pa=\{X|\|X-Oi\|>r+Wi\} \quad \text{(Formula 4)}$$

Here, r is a necessary distance for an obstacle to safely avoid the collision with the autonomous moving device 1 and r is set on the basis of the size of the autonomous moving device 1, a distance between the autonomous moving device 1 and another moving body when the autonomous moving device 1 and the other moving body pass each other, and a distance between the autonomous moving device 1 and a peripheral object when another component of the autonomous moving device 1 is operated.

In S103, a passage area 51 of a currently captured obstacle is estimated. When the coordinates from the origin of N obstacles Oi obtained from the information storage unit 21 are Oi, the velocity vector is Vi, and the unit normal vector of Vi is ni, the passage area T(Oi) of the Oi is estimated as the formula 5.

[Formula 5]

$$T(Oi)=Oi+s\cdot Vi+t\cdot ni, s\geq 0 \text{ and } |t|\leq Wi/2+r \quad \text{(Formula 5)}$$

Figure 6:
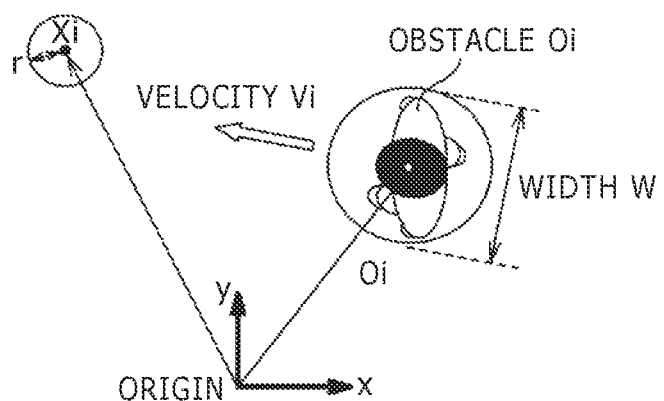
FIG. 6 is a setting method of an obstacle passage area according to the first embodiment.
Figure 6:
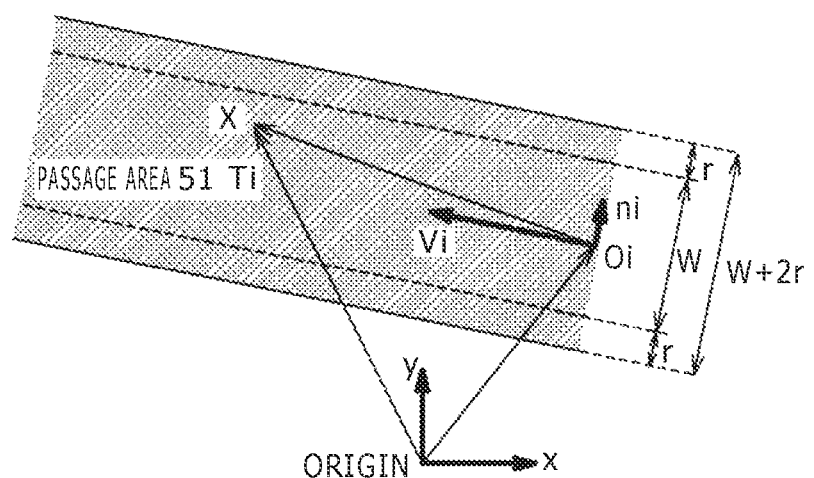

As shown in FIG. 6, when the current position Xi of the autonomous moving device 1 is substituted for the left term of the formula 5 and s and t are obtained, if the values of s and t satisfy s≥0 and |t|≤Wi/2+r, it is determined that the autonomous moving device 1 is in the passage area of the obstacle Oi.

In S104, a virtual passable area 61 (shaded area in FIG. 7) is set which is an area virtually set to be passable for the sake of calculation. The virtual passable area 61 is set as described below on the basis of the avoidance priority order set by the obstacle classification unit 25.

Figure 7:
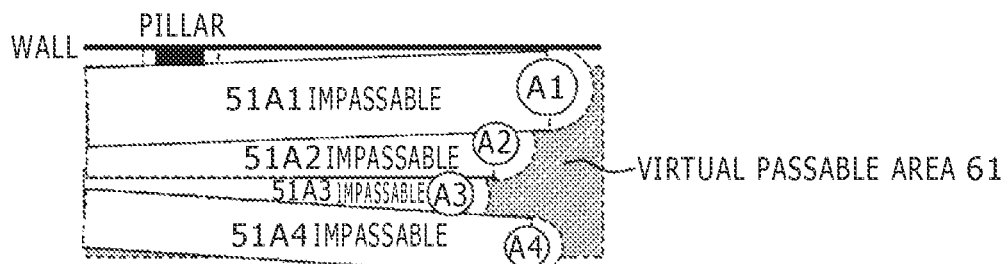
FIG. 7 is a diagram for explaining a virtual passable area according to the first embodiment.
Figure 7:
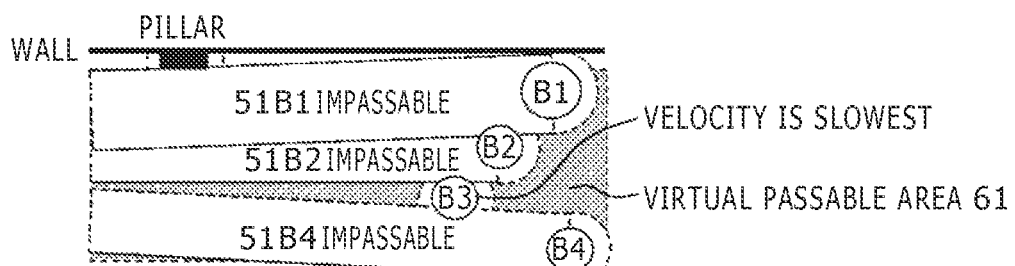
Figure 7:
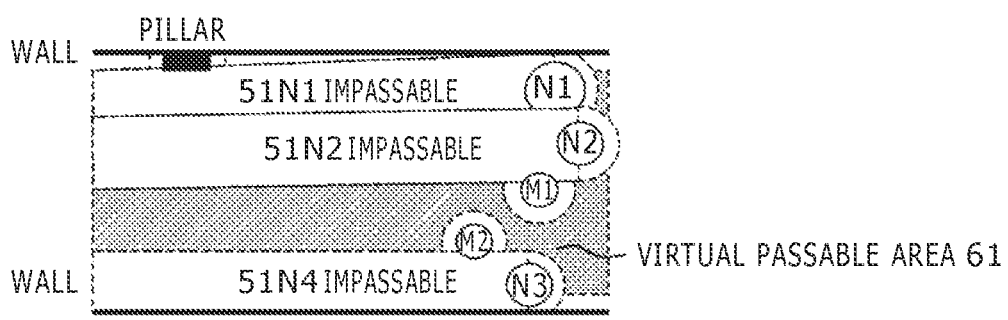
Figure 7:
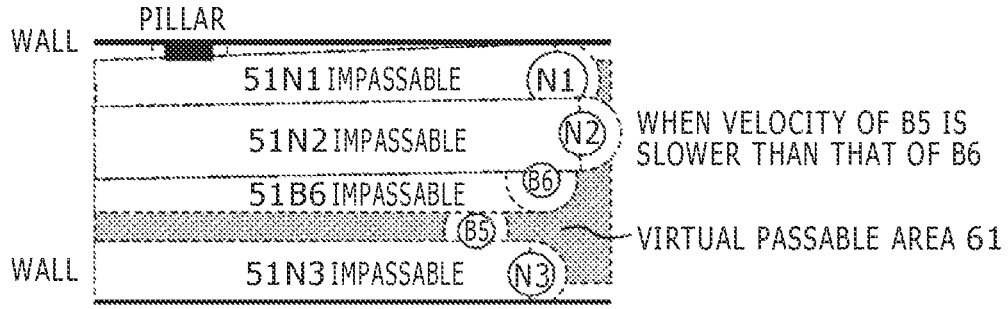

(1) When the types of N obstacles Ai (i=1, 2, . . . , N) in the passable area 60 or the virtual passable area 61 are only A, the passage areas 51Ai of all the obstacles are set to be impassable as shown in FIG. 7(*a*) and the remaining area is set to a virtual passable area 61P. When the coordinates of Ai from the origin are Oi, the width is Wi, the velocity vector of each obstacle is Vi, and the unit normal vector of Vi is ni, the virtual passable area 61P is represented by the formula 6.

[Formula 6]

$$P=\{X|X=Oi+s\cdot Vi+t\cdot ni, i \text{ is a natural number from 1 to } N \text{ and } (s<0 \text{ or } |t|>Wi/2+r)\} \quad \text{(Formula 6)}$$

(2) When the types of N obstacles Bi (i=1, 2, . . . , N) in the passable area 60 or the virtual passable area 61 are only B, the passage areas 51Bi of the obstacles Bi (i≠k) except for an obstacle Bk whose velocity is the slowest are set to be impassable as shown in FIG. 7(*b*) and the remaining area is set to a virtual passable area 61P (shaded area in FIG. 7(*b*)).

[Formula 7]

$$P=\{X|X=Oi+s\cdot Vi+t\cdot ni, i \text{ is a natural number from 1 to } N \text{ other than } k \text{ and } (s<0 \text{ or } |t|>Wi/2+r)\} \quad \text{(Formula 7)}$$

As the aforementioned Bk, an obstacle which is the last obstacle to be collided with may be selected.

(3) When the types of the obstacles in the passable area 60 or the virtual passable area 61 are only C, the passable area 60 or the virtual passable area 61 are used without change.

(4) When there are at least two types (among A, B, and C) of obstacles in the passable area 60, the passage areas of all the obstacles except for obstacles of the type whose avoidance priority is the lowest are set to be impassable and the remaining area is set to a virtual passable area 61. As shown in FIG. 7(*c*-1), when P obstacles Mi (i=1, 2, . . . , P) are obstacles of the type whose avoidance priority is the lowest, Q obstacles Nj (j=1, 2, . . . , Q) are obstacles of the other types, the coordinates of Nj is Nj, the velocity is Vj, and the unit normal vector of Vj is nj, the virtual passable area 61P (shaded area in FIG. 7(*c*-1)) is represented by the formula 8.

[Formula 8]

$$P=\{X|X=Nj+s\cdot Vj+t\cdot nj, j=1,2,\ldots,Q \text{ and } (s<0 \text{ or } |t|>Wj/2+r)\} \quad \text{(Formula 8)}$$

The virtual passable area 61 is set as described above, so that the obstacles located in the virtual passable area 61 can be limited to one of the B and C types. Therefore, by performing (2) or (3) described above and updating the virtual passable area, the virtual passable area 61 finally becomes as shown in FIG. 7(*c*-2).

In S105, the destination point TG is determined based on the virtual passable area 61 set in S104. The determination method of the TG will be described with reference to FIG. 8.

Figure 8:
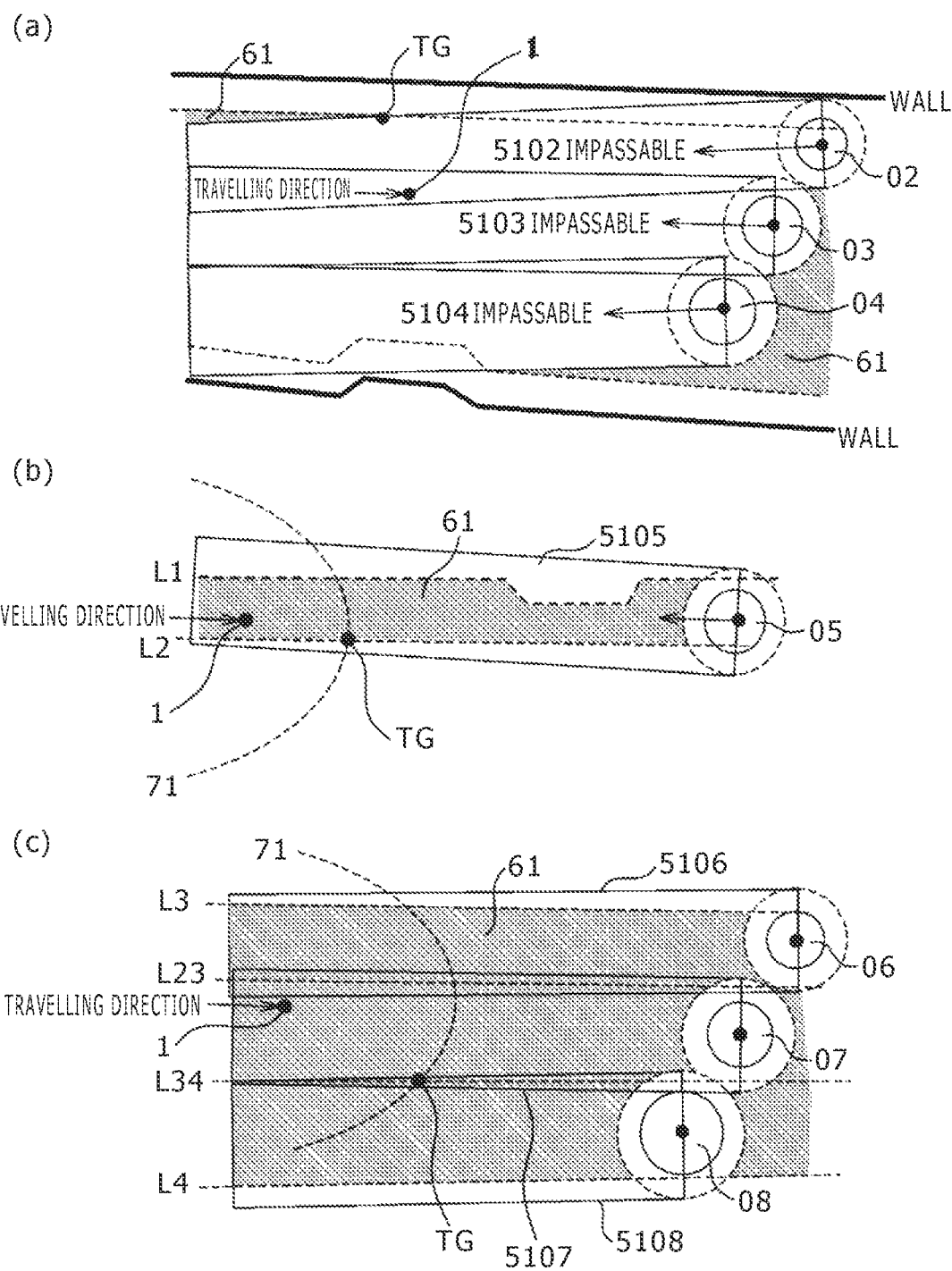
FIG. 8 is a diagram for explaining a determination method of a destination point TG according to the first embodiment.

When all the types of the obstacles are the class A, as shown in FIG. 8(*a*), the travelling direction of the autonomous moving device 1 is blocked by impassable areas. In this case, a point behind the autonomous moving device 1 and closest to the autonomous moving device 1 in the virtual passable area is determined as the destination point TG. When the obstacles include an obstacle of a class other than A, by the process of (2), (3), or (4) in S104, in the virtual passable area 61, there is only one obstacle of class B or C or there are plural obstacles of class C.

When there is only one obstacle O5 in the virtual passable area 61 as shown in FIG. 8(*b*), if the autonomous moving device 1 moves to a boundary line L1 or L2 of the virtual passable area 61, the change of course of the obstacle O5 can be small. To uniquely determine the position on L1 or L2, for example, the intersection points between a stop position 71 when the autonomous moving device 1 decelerates at the maximum acceleration in a possible turning direction and L1 and L2 are determined as candidates of the TG. If the distance between the autonomous moving device 1 and L1 is greater than the distance between the center of the autonomous moving device 1 and L2, the intersection point between L1 and the stop position 71 is determined as a temporary destination point TG, and if it is the other way around, the intersection point between L2 and the stop position 71 is determined as a temporary destination point TG. As show in FIG. 8(*c*), when there are N obstacles (Oi, i=1, 2, . . . , N) in the virtual passable area 61, if the autonomous moving device 1 moves to the boundary lines L1 and L2 of the virtual passable area 61 and a median line Lik between boundary lines of passage areas 51Oi and 51Ok of obstacles Oi and Ok (k=1, 2, . . . , N, |i−k|=1) adjacent to each other, the changes of courses of the obstacles are small, so that, in the same manner as in the case in which there is one obstacle, a point at which the distance between the boundary of the passage area of the obstacle and the autonomous moving device 1 is the greatest is determined as the temporary destination point TG from among the intersection points between the stop position 71 and each of L3, L4, and Lik).

The control device 122 controls the motor 112 of the travel unit 11 so that the forward velocity and the tangential velocity of the autonomous moving device 1 are performed as instructed by the travel control unit 24.

Hereinafter, an operation example of the autonomous moving device 1 will be described with reference to FIGS. 1, 9, 10, and 11.

In these drawings, to easily understand the concept, r in the formulas 4 to 8 is set to 0, and instead an area 72 occupied by the autonomous moving body 1 is represented by a circle whose radius is r and center is the position of the autonomous moving device.

Figure 9:
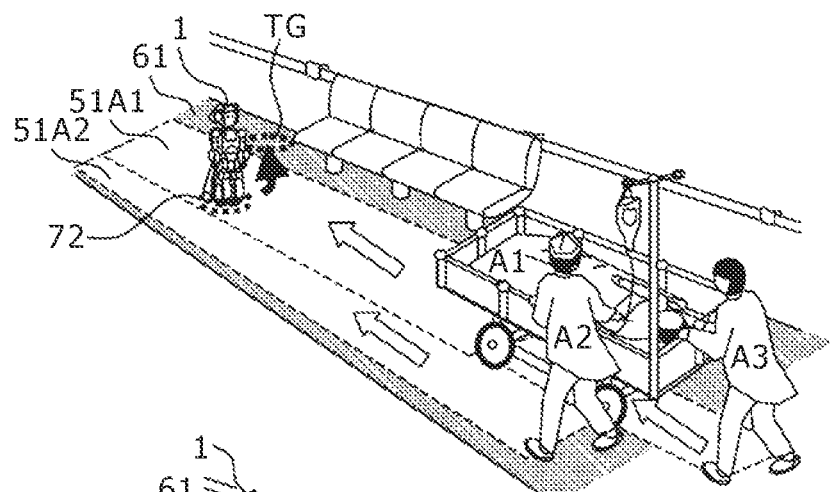
FIG. 9 is a movement example of a case in which the obstacles are only class A according to the first embodiment.
Figure 9:
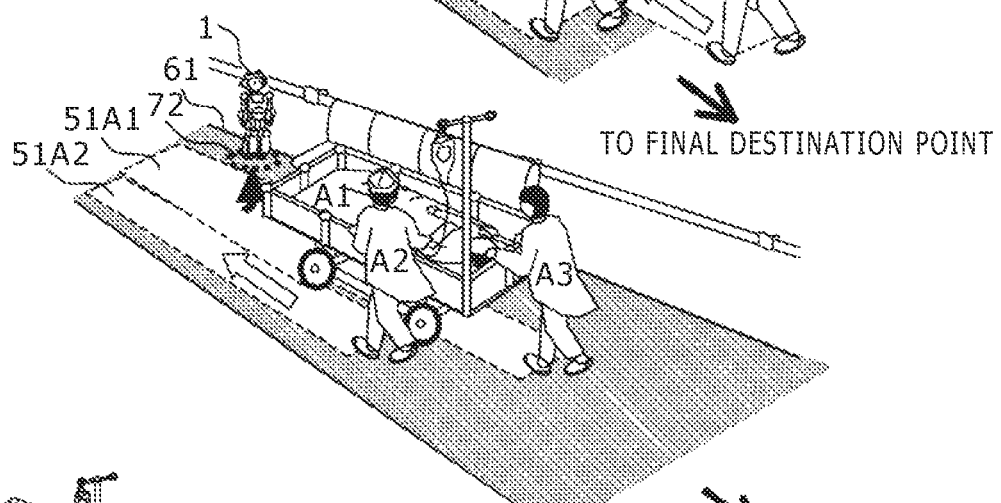
Figure 9:
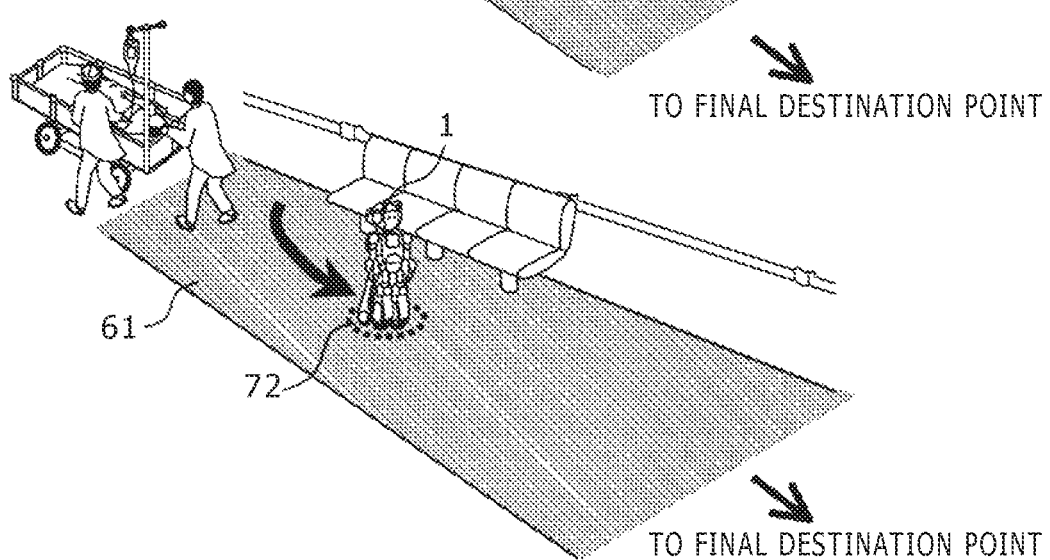

FIG. 9 is a movement example of a case in which the obstacles are only class A according to the first embodiment.

Figure 10:
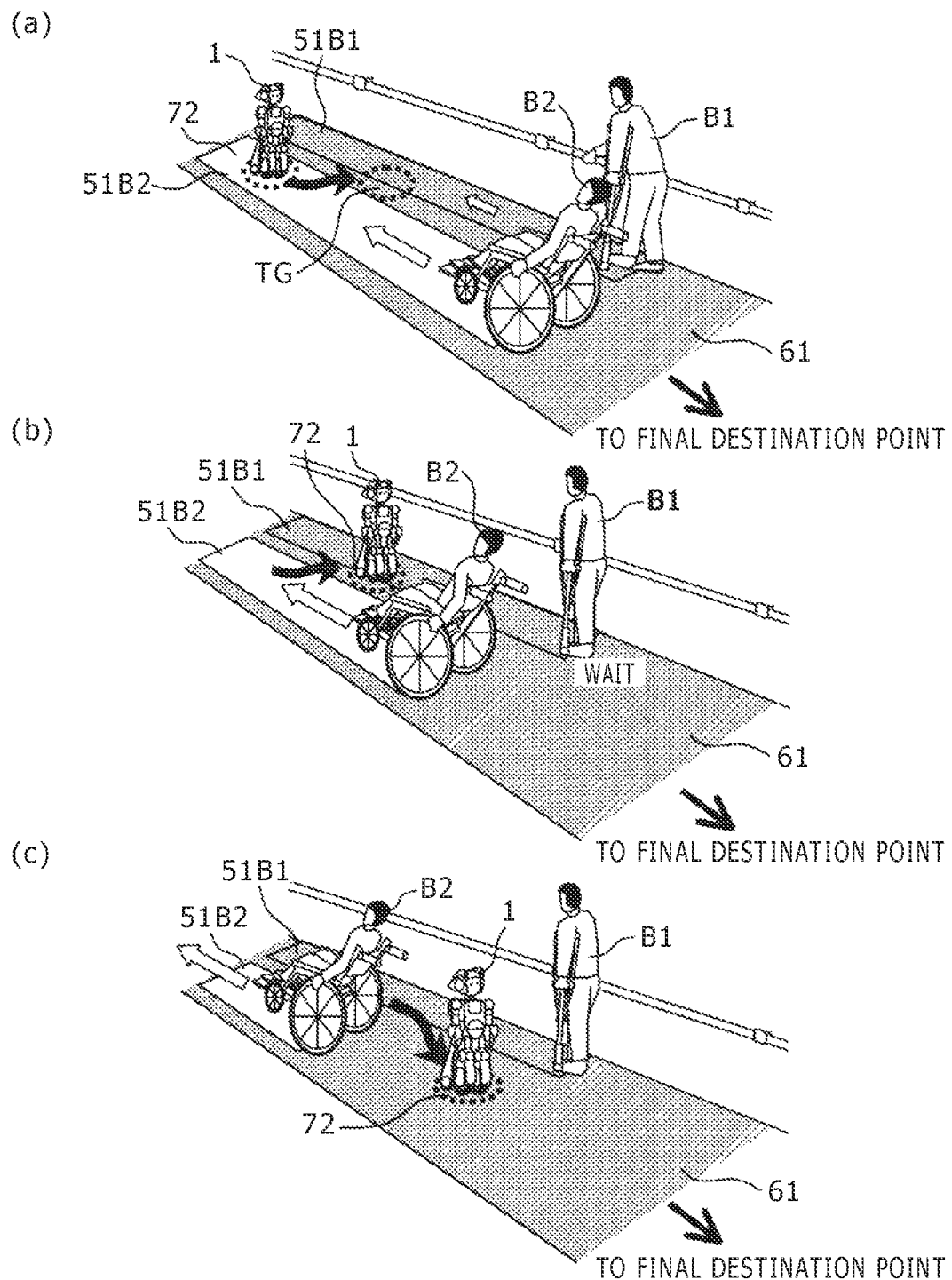
FIG. 10 is a movement example of a case in which the obstacles are only class B according to the first embodiment.

FIG. 10 is a movement example of a case in which the obstacles are only class B according to the first embodiment.

Figure 11:
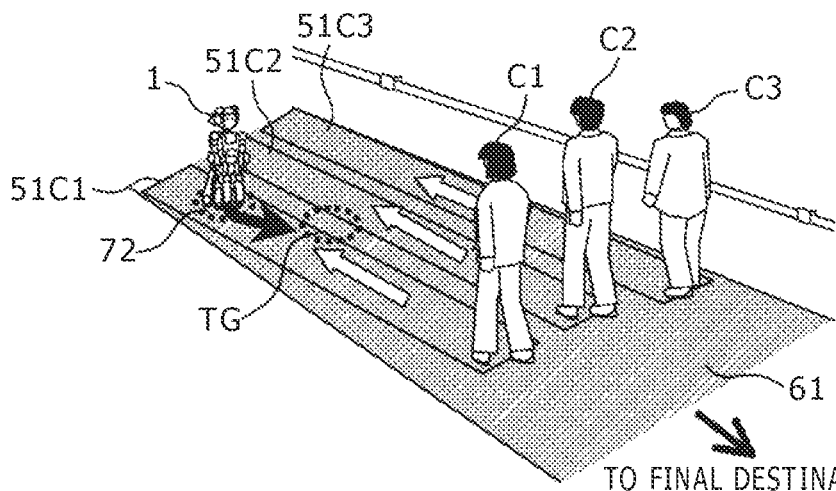
FIG. 11 is a movement example of a case in which the obstacles are only class C according to the first embodiment.
Figure 11:
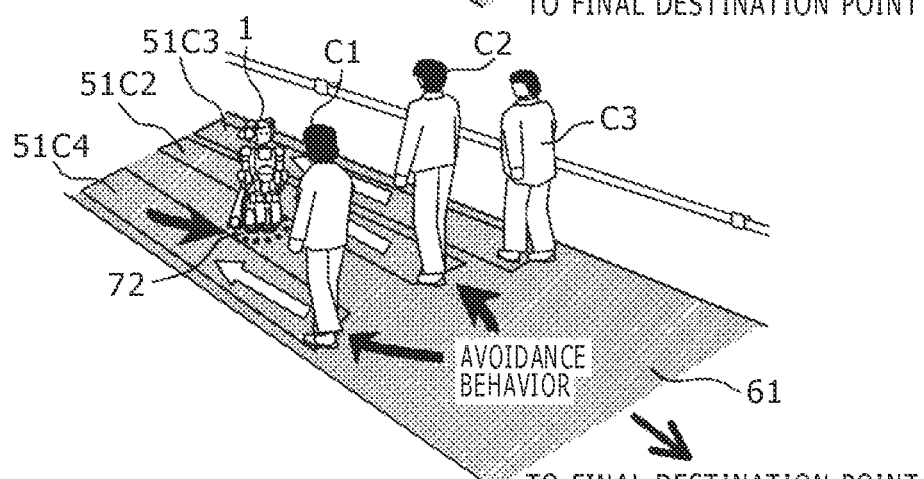
Figure 11:
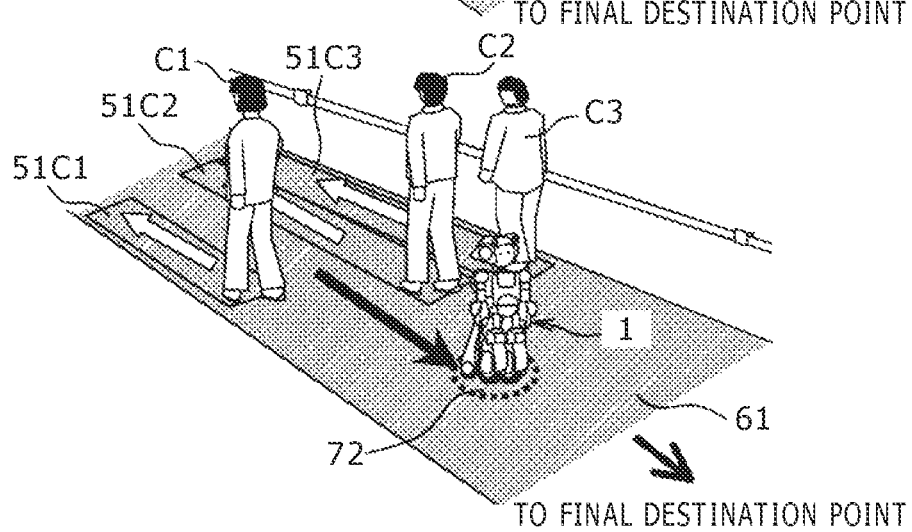

FIG. 11 is a movement example of a case in which the obstacles are only class C according to the first embodiment.

FIG. 1 is an example of a case in which the movement of the autonomous moving device 1 is blocked by plural obstacles.

For example, the healthy person C1 is classified to the class C and the disabled person B1 and the wheelchair B2 are classified to the class B. The healthy person C1 of the class C is a type with the lowest avoidance priority, so that as shown in FIG. 1(a), the autonomous moving device 1 cannot pass through the passage areas of the obstacles B1 and B2 other than the healthy person C1, and the virtual passage area 61 is set. When the destination point TG is determined according to S105 in FIG. 4, the TG is set at a point at which the courses of B1 and B2 are not blocked and the change of course of C1 can be small.

When the autonomous moving device 1 moves to TG as shown in FIG. 1(b), it can be expected that B1 and B2 advance without change and C1 performs an avoidance behavior. As shown in FIG. 1(3), the autonomous moving device 1 can move through the passage by the avoidance behavior of C1 and the autonomous moving device 1 restarts the movement to the final destination point.

FIG. 9 is an example of a case in which the movement of the autonomous moving device 1 is blocked by a bed A1 being transported in emergency and nurses A2 and A3.

In FIGS. 9, A1, A2, and A3 are faster than Vmax in formula 3 and move at the same velocity, so that A1, A2, and A3 are classified to the class A. Therefore, the passage areas of all the obstacles are impassable and the virtual passable area 61 is as shown in FIG. 9(a). There is no virtual passable area 61 that includes the occupied area 72 at a position at which the autonomous moving device 1 can stop at the maximum acceleration, so that the temporary destination point TG is set behind the autonomous moving device 1 and the autonomous moving device 1 moves to the temporary destination point TG as shown in FIG. 9(b). In this way, the autonomous moving device 1 can wait for passage of the obstacles at TG without affecting the movements of the obstacles. After all the obstacles have passed as shown in FIG. 9(c), the autonomous moving device 1 restarts the movement to the final destination point.

FIG. 10 is an example of a case in which the movement of the autonomous moving device 1 is blocked by the disabled person B1 and the wheelchair B2.

In FIG. 10, the disabled person B1 whose velocity is slow and the wheelchair B2 whose width is large are classified to the class B. When the moving velocity of the disabled person B1 is slower, as shown in FIG. 10(a), the passage area 51B2 of the obstacle B2 other than B1 is impassable. In the set virtual passable area 61, the temporary destination point TG is set so that the occupied area 72 does not overlap 51B2, and the autonomous moving device 1 moves to the temporary destination point TG as shown in FIG. 10(b). Although it is expected that the course change of the disabled person B1 is difficult because the disabled person B1 moves along a wall, the disabled person B1 can easily stop because the velocity of B1 is slow. If the disabled person B1 waits until the wheelchair B2 advances and a passable distance is formed between the disabled person B1 and the autonomous moving device 1 as shown in FIG. 10(c), it is expected that the autonomous moving device 1 can pass through. When the autonomous moving device 1 can pass through, the autonomous moving device 1 restarts the movement to the final destination point.

FIG. 11 is a case in which the passage through which the autonomous moving device 1 is passing is blocked by three pedestrians.

In FIG. 11, all the pedestrians C1, C2, and C3 are classified to the class C, so that the virtual passable area 61 is the same as the passable area 60 as shown in FIG. 11(a). By S105 shown in FIG. 4, TG is set on the median line between the boundary lines of the passage areas 51C1 and 51C2 of the pedestrians C1 and C2, and when the autonomous moving device 1 moves to TG, it is expected that the pedestrians C1 and C2 perform an avoidance behavior as shown in FIG. 11(b). When the gap between the pedestrians C1 and C2 widens and the autonomous moving device 1 becomes able to move, the autonomous moving device 1 restarts the movement to the final destination point as shown in FIG. 11(c).

As described above, when the way of the autonomous moving device 1 is blocked by obstacles, the autonomous moving device 1 classifies the obstacles according to the avoidance capability thereof and gives avoidance priority to each obstacle and further estimates the passage areas of the obstacles, so that the autonomous moving device 1 does not enter the passage area of a moving body whose avoidance capability is low and moves to a position at which course change of a moving body who has high avoidance capability is small. Therefore, it is possible to safely and efficiently avoid collision between an obstacle and the autonomous moving body.

Second Embodiment

In the present embodiment, a case in which the autonomous moving device includes a computer will be described with reference to FIGS. 12 to 15.

The autonomous moving device of the present embodiment has a size on which a human being can ride and mainly travels outdoors. The present embodiment is different from the first embodiment in the points described below and the other points are the same as those of the first embodiment, so that redundant description will be omitted. In the present embodiment, the same components as those in the first embodiment have the same effects as those in the first embodiment.

Figure 12:
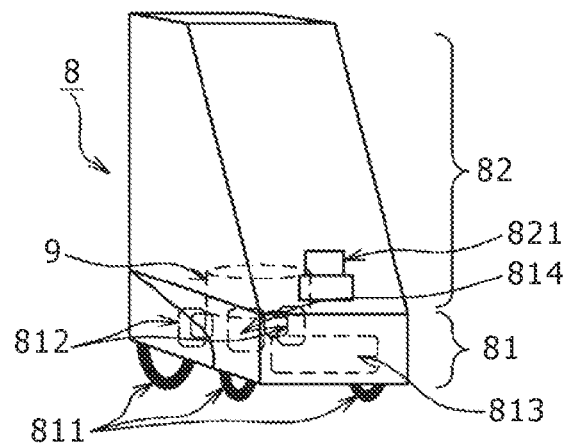
FIG. 12 is a configuration diagram of an autonomous moving device according to a second embodiment.
Figure 12:
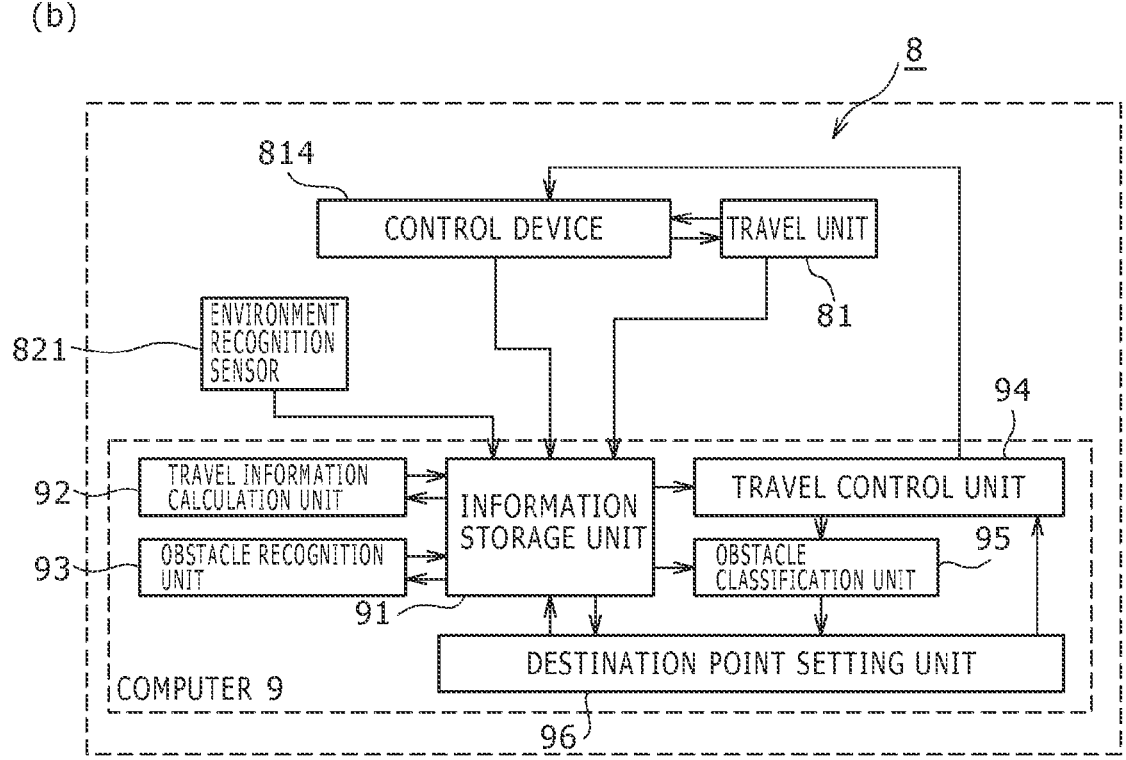

FIG. 12 is a configuration diagram of the autonomous moving device according to the second embodiment.

Figure 13:
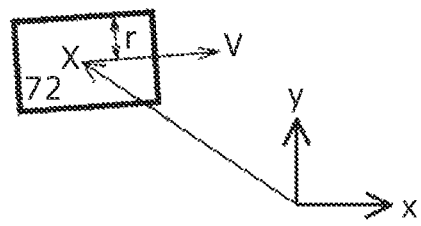
FIG. 13 is an operation flowchart of the autonomous moving device according to the second embodiment.

FIG. 13 is an operation flowchart of the autonomous moving device according to the second embodiment.

Figure 14:
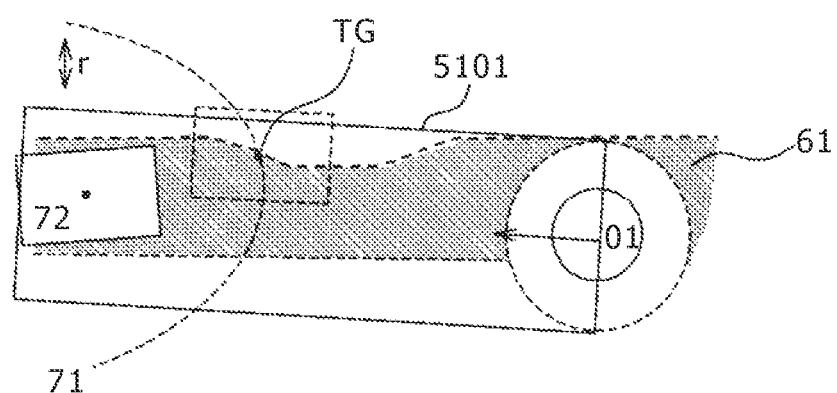
FIG. 14 is a diagram for explaining a determination method of a temporary destination point TG according to the second embodiment.
Figure 14:
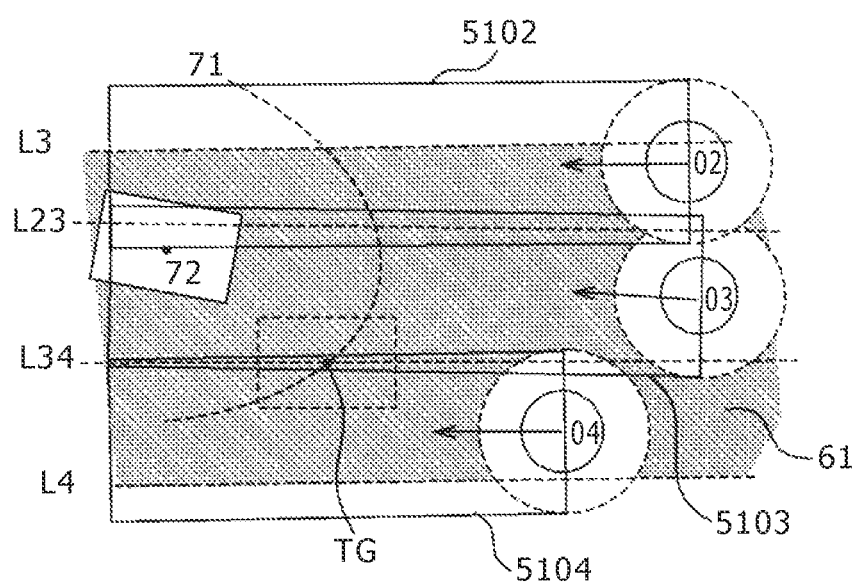

FIG. 14 is a diagram for explaining a determination method of a temporary destination point TG according to the second embodiment.

Figure 15:
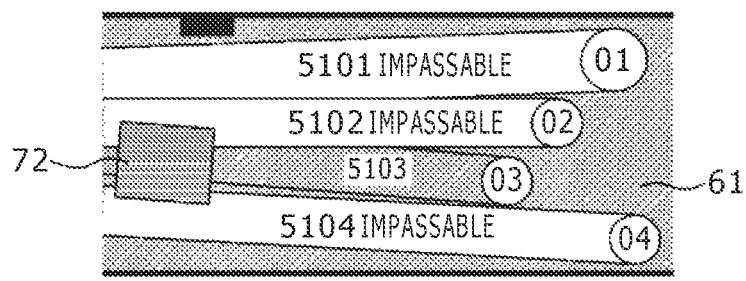
FIG. 15 is a diagram for explaining a determination method of TG when the autonomous moving device cannot pass through a virtual passable area according to the second embodiment.

FIG. 15 is a diagram for explaining a determination method of TG when the autonomous moving device cannot pass through a virtual passable area according to the second embodiment.

In FIG. 12, a mechanical configuration diagram of an autonomous moving device 8 of the present embodiment is shown in FIG. 12(a) and a system configuration diagram of the autonomous moving device 8 is shown in FIG. 12(b). The autonomous moving device 8 includes a travel unit 81 and a riding unit 82. Although the computer is located outside in the first embodiment, a computer 9 is included in the travel unit 81 in the present embodiment and a control device 814 included in the travel unit 81 is wired-connected to the computer 9. Therefore, the components transmit and receive information to and from each other through the communication instruments 3 and 124 in the first embodiment can directly transmit and receive information to and from each other by a cable. Further, the travel unit 81 includes wheels 811 to move the autonomous moving device, drive motors 812 including encoders respectively at the rear left and the rear right wheels, and a battery 813 which is a power source in the travel unit. The riding unit 82 has an inside volume which a human being can enter and includes a laser scanner as an environment recognition sensor 821.

As shown in FIG. 13, in the second embodiment, an occupied area 71 of the autonomous moving device 8 is represented by a rectangle whose width with respect to the travelling direction is r in the formula 4, so that it is possible to estimate the distance between an obstacle and a surface of the autonomous moving device 8 according to the orientation of the autonomous moving device 8. The length of the occupied area 71 in the front-rear direction is set based on the size of the autonomous moving device 8 and a distance between the autonomous moving device 8 and a peripheral object when the autonomous moving device 8 stops.

A travel control unit 94 controls not only the position of the autonomous moving device 8, but also the orientation of the autonomous moving device 8 in order to easily avoid other obstacles. For example, when an angle function θgoal in the formula 1 is set so that the more the orientation is close to a direction in parallel with the boundary line of the passage area of the obstacle as shown in FIG. 14(a) (when the number of the obstacles in the virtual passable area is one) or the more the orientation is close to a direction in parallel with the median line between boundary lines of passage areas adjacent to each other as shown in FIG. 14(b) (when the number of the obstacles in the virtual passable area is two or more), the greater the value of the angle function θgoal is, it is possible to reduce the change of course of obstacles which the autonomous moving device 8 passes.

It is assumed that the autonomous moving device 8 of the present embodiment carries a human being, so that the width r of the occupied area 71 is greater than that of a human being. Therefore, when the virtual passable area 61 is set in the same manner as in the first embodiment, as shown in FIG. 15, the occupied area 72 may not be completely away from the passage areas 51 of the obstacles, which are impassable.

However, in FIG. 15 (when the virtual passable area is narrower than the width of the autonomous moving device), to easily understand the phenomenon, the virtual passable area 61 is shown by ignoring the width r of the occupied area 72. When the occupied area 72 cannot be completely away from the passage areas 51 of the obstacles, which are impassable, impassable passage areas of the passage areas 51 of the obstacles whose class is not A are made passable one by one in ascending order of R, and re-setting is tried so that the occupied area 72 does not enter the impassable passage areas 51. If the re-setting is impossible or if the classes of the obstacles of the impassable passage areas are only A, in the same manner as in the first embodiment, a point which is located in the virtual passage area 61 behind the autonomous moving device 8 and which is closest to the autonomous moving device 61 is set to the destination point TG.

Third Embodiment

Figure 16:
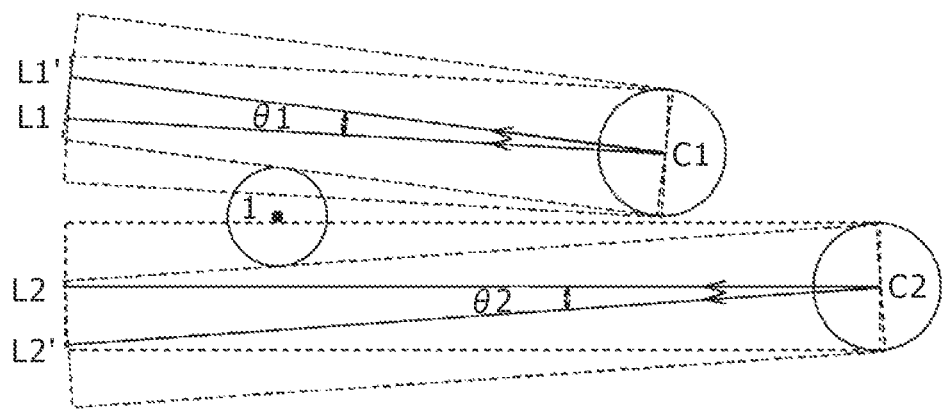
FIG. 16 is a diagram for explaining a determination method of TG according to a third embodiment.

In the first and the second embodiments, as shown in FIG. 16, when the center lines of the current passage areas of the obstacles C1 and C2 are L1 and L2 and the center lines of passage areas of the obstacles C1 and C2 when avoiding the autonomous moving body are L1' and L2', if a point where the angle θ1 formed by the L1 and L1' is equal to the angle θ2 formed by the L2 and L2' is determined as TG, the temporary destination point TG can reduce the change of course of both obstacles C1 and C2.

Fourth Embodiment

Figure 17:
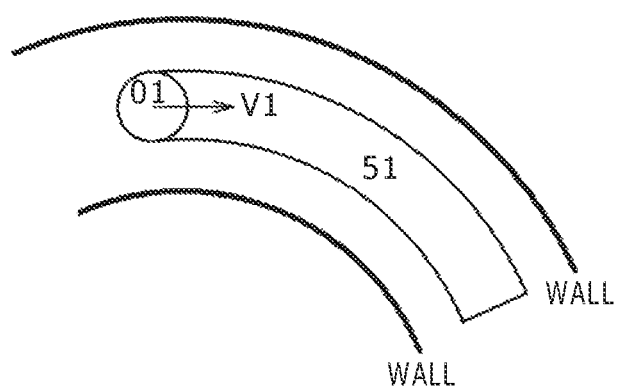
FIG. 17 is a diagram showing a setting example of a passage area according to topographic features according to a fourth embodiment.

In the first and the second embodiments, the obstacle passage possible areas 51 may be set according to not only the velocity and the width of the obstacle but also a motion pattern of the obstacle and peripheral topography. For example, as shown in FIG. 17, if the obstacle is passing through a curve, a method of setting an arc-shaped passage area according to the curve is considered.

Fifth Embodiment

In the first to the fourth embodiments, the travel control unit can be preferably used as any method that can control the autonomous moving device under an environment in which an obstacle exists. For example, as a method of transmitting a target velocity to the control device, for example, when the target velocity becomes lower than or equal to 0, the travel control unit determines that it is impossible to avoid the obstacle. Further, for example, when the travel control unit generates a route to the destination point, if the travel control unit determines that it is impossible to generate the route, it can be determined that it is impossible to avoid the obstacle. Further, the travel unit can be preferably used as a device that moves the autonomous moving device, and wheels including a steering mechanism, legs, a hover, and the like are preferably used as the travel unit according to a surrounding environment.

As an environment recognition unit, which can estimate the width, the position, and the velocity of an obstacle, various sensors using a millimeter wave, an ultrasonic wave, or the like, a pressure sensor, a communication device that detects an IC tag or the like when an obstacle to be avoided has the IC tag or the like, or the combination of the above components can be preferably used.

Regarding the obstacle classification unit, obstacles may be classified without performing obstacle avoidance capability evaluation by attaching a transmitter for each type of the autonomous moving device and the obstacles, receiving the type, position, velocity information, and the like of the obstacles by a receiver attached to the autonomous moving device or a portion near the autonomous moving device, and transmitting the received information to a computer. Or, the obstacles maybe classified from the appearance of the obstacles by using a camera, a 3D laser scanner, or the like, which acquires the appearance. The weight may be used instead of the width of the obstacle. When using the weight, pressure sensors are arranged under the entire floor on which the autonomous moving device travels, so that the weight of the obstacle can be estimated from a measurement result. The avoidance priority may be set by considering the moving area of the autonomous moving device. For example, there is a method in which the autonomous moving device moves based on map data, the map data has an avoidance priority setting method for each area, and the avoidance priority is set based on the avoidance priority setting method.

LIST OF REFERENCE SIGNS

1 . . . Autonomous moving device of the first embodiment, 11 . . . Travel unit of the first embodiment, 111 . . . Wheel of the first embodiment, 112 . . . Motor of the first embodiment, 12 . . . Upper body of the first embodiment, 121 . . . Battery of the first embodiment, 122 . . . Control device of the first embodiment, 123 . . . Environment recognition sensor of the first embodiment, 124 . . . Communication instrument included in the upper body 11, 2 . . . Computer of the first embodiment, 20 . . . Action determination unit of the first embodiment, 21 . . . Information storage unit of the first embodiment, 22 . . . Travel information calculation unit of the first embodiment, 23 . . . Obstacle recognition unit of the first embodiment, 24 . . . Travel control unit of the first embodiment, 25 . . . Obstacle classification unit of the first embodiment, 26 . . . Destination point setting unit of the first embodiment, 3 . . . Communication instrument connected to the computer 2, 51 . . . Passage area, 60 . . . Passable area, 61 . . . Virtual passable area, 71 . . . Shortest stop position of the autonomous moving device, 72 . . . Occupied area of the autonomous moving device, 8 . . . Autonomous moving device of the second embodiment, 81 . . . Travel unit of the second embodiment, 811 . . . Wheel of the second embodiment, 812 . . . Motor of the second embodiment, 813 . . . Battery of the second embodiment, 814 . . . Control device of the second embodiment, 82 . . . Riding unit of the second embodiment, 821 . . . Environment recognition sensor of the second embodiment, 9 . . . Computer of the second embodiment, 91 . . . Information storage unit of the second embodiment, 92 . . . Travel information calculation unit of the second embodiment, 93 . . . Obstacle recognition unit of the second embodiment, 94 . . . Travel control unit of the second embodiment, 95 . . . Obstacle classification unit of the second embodiment, 96 . . . Destination point setting unit of the second embodiment, Oi, Ai, Bi, Ci . . . ith obstacle, Li . . . Boundary line of ith virtual passable area 61, Ljk . . . Median line between boundary lines of jth passage area 51 and kth passage area adjacent to each other, TG . . . Temporary destination point

The invention claimed is:

1. An autonomous moving device comprising:
a travel unit including a wheel driven by a motor; and
an upper body including an environment recognition sensor that detects an obstacle in a traveling direction, wherein
the upper body includes:
a means for recognizing a position of the autonomous moving device and an obstacle; a means for evaluating avoidance capability of the obstacle, a means for determining capability of avoidance of collision with the obstacle; and
a means for obtaining priority of collision avoidance of an estimated passage area of the obstacle from the capability of avoidance of collision, and
the upper body further includes:
a control unit that moves the travel unit to a range which is an area where an estimated passage area of an obstacle whose priority of collision avoidance is high does not overlap an area where the travel unit is located and which is an area where collision can be avoided even if an area where an estimated passage area of an obstacle whose priority of collision avoidance is low overlaps the area where the travel unit is located.

2. The autonomous moving device according to claim 1, wherein
the means for evaluating avoidance capability quantitatively calculates the avoidance capability from a velocity and a width of the obstacle.

3. The autonomous moving device according to claim 1, wherein
the means for evaluating avoidance capability sets avoidance priority of the obstacle whose avoidance capability is lower than a reference value to be high.

4. The autonomous moving device according to claim 1, wherein the means for evaluating avoidance capability sets avoidance priority of an obstacle whose velocity is slower than a reference range and an obstacle whose velocity is faster than the reference range to be high.

5. The autonomous moving device according to claim 1, wherein the means for evaluating avoidance capability classifies the obstacle into several types on the basis of avoidance capability.

6. A control method of an autonomous moving device including a travel unit having a wheel driven by a motor, an upper body having an environment recognition sensor that detects an obstacle in a traveling direction, and a communication device that communicates with a computer including an information storage unit, a travel information calculation unit, an obstacle recognition unit, a travel control unit, an obstacle classification unit, a destination point setting unit, and an action determination unit, the control method comprising:
recognizing a position of the autonomous moving device and the obstacle;
evaluating avoidance capability of the obstacle;
determining capability of avoidance of collision with the obstacle;
determining the presence or absence of information from the obstacle classification unit;
transmitting a final destination point in the information storage unit to the travel control unit as a current destination point when no information is transmitted from the obstacle classification unit;
obtaining a passable area in which the autonomous moving device can travel without colliding with an obstacle by a travel unit when information is transmitted from the obstacle classification unit;
estimating a passage area of a currently captured obstacle;
obtaining priority of collision avoidance of an estimated passage area of the currently captured obstacle from the capability of avoidance of collision;
setting a virtual passable area which is an area virtually set to be passable for the sake of calculation;
determining a destination point based on the virtual passable area;
controlling the autonomous moving device to travel to the destination point; and
moving the travel unit to a range which is an area where an estimated passage area of an obstacle whose priority of collision avoidance is high does not overlap an area where the travel unit is located and which is an area where collision can be avoided even if an area where an estimated passage area of an obstacle whose priority of collision avoidance is low overlaps the area where the travel unit is located.

* * * * *